May 25, 1943.   W. G. TUTTLE   2,319,893
DERRICK FRAME
Filed May 11, 1942
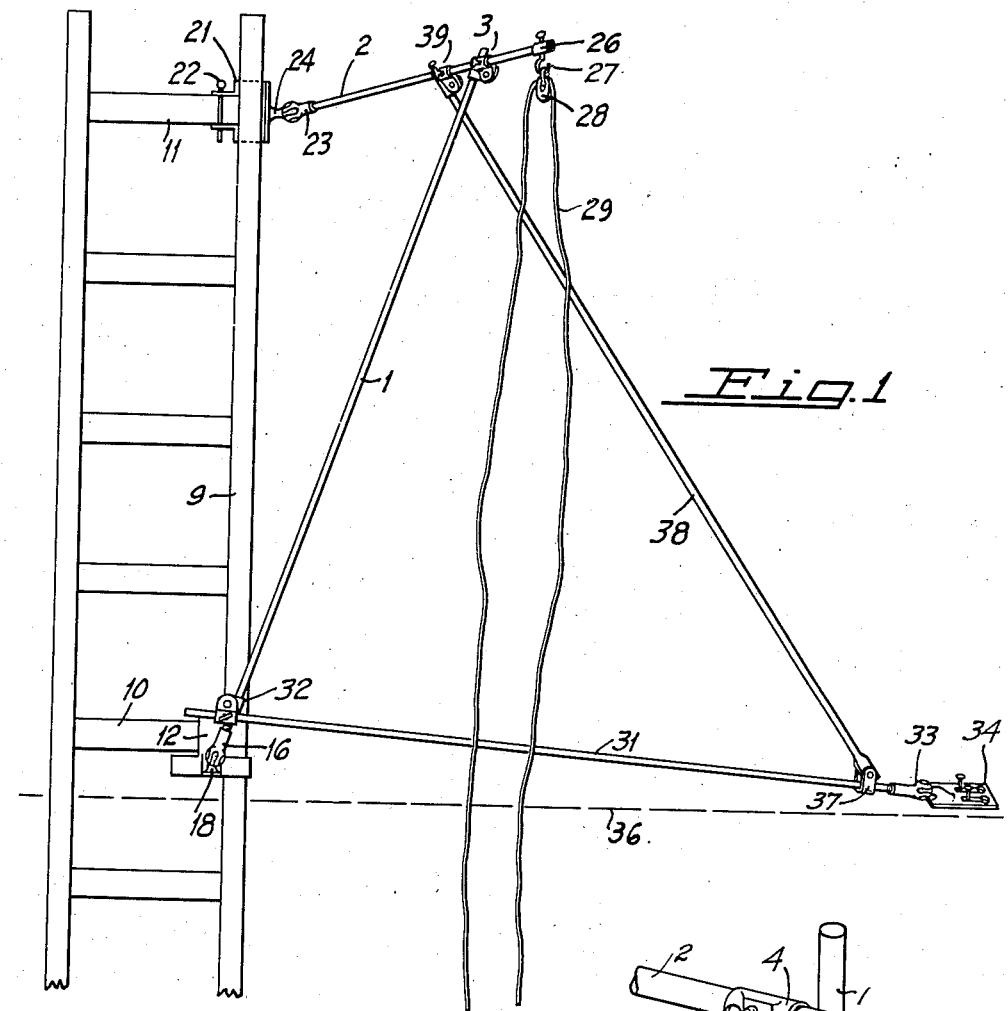
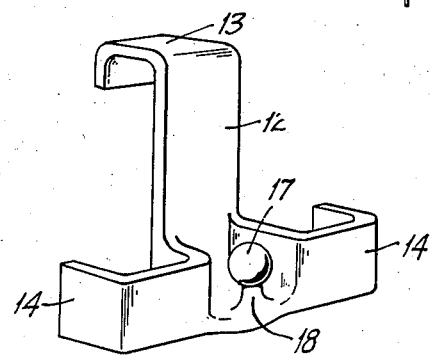
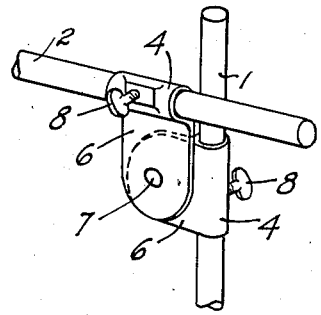
INVENTOR.
WILLIAM GLENN TUTTLE
BY Charles S. Evans
HIS ATTORNEY Patented May 25, 1943

2,319,893

UNITED STATES PATENT OFFICE 2,319,893

DERRICK FRAME

William Glenn Tuttle, Oakland, Calif.

Application May 11, 1942, Serial No. 442,561

5 Claims. (Cl. 254—139)

My invention relates to a frame arranged to be mounted upon a ladder for use as a derrick.

It is among the objects of my invention to provide a combination of V-shaped frames having means for adjusting the relationships and lengths of the legs of each frame to suit various requirements.

Another object of my invention is to provide a derrick frame arranged for quick attachment to side rail and rungs of a ladder.

Another object is to provide a joint by which the effective lengths and angular relationships of the legs of a derrick frame may be readily adjusted and fixed in position.

Still another object of my invention is the provision of a derrick frame of the character described which can be made up of standard pipe members and inexpensive cast or malleable fittings.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

In the drawing:

Figure 1 is a perspective view of the device of my invention, as set up to provide a derrick.

Figure 2 is a perspective view showing my preferred clamp joint for joining the frame members.

Figure 3 is a perspective view of a ladder clasping foot for one of the frame legs.

In terms of broad inclusion, the device of my invention comprises a pair of V-shaped frames, one of the frames having members or legs joined in universally adjustable relation adjacent the apex of the frame, near which is arranged the suspension point for a tackle block. Means are provided at the free ends of the frame legs for clasping either side rail of a ladder at selected rungs. The second V-shaped frame constitutes a brace or stay for the main frame, its members being attached to the main frame and arranged to extend laterally therefrom in universally adjustable relation thereto, to a point of anchorage for bracing the main frame and ladder against lateral displacement. Universal adjustment of the frame members on each other is preferably effected by means of a clamp joint permitting the lengths and angular relationships of the legs to be altered to suit various requirements, and then fixed in that adjustment. Other universal adjustments, of which three are used, are by ball joints.

In terms of greater detail, the derrick of my invention comprises a pair of frame members or legs 1 and 2, adjustably connected, one to the other, at a point forming the apex of a V. The legs are preferably round in cross section, and may be of any length and weight suitable for their purposes. Pipe or tubing of suitable diameter are desirable materials; but solid rods may be used.

The legs 1 and 2 are connected together by a clamp joint designated in general by the numeral 3, which preferably comprises a pair of sleeves 4, in which the legs 1 and 2 are longitudinally movable to alter their effective length or the length of the lever arm involved. Each sleeve of the pair is provided with a tangentially extending flange 6; and the flanges are pivotally connected back to back by a rivet 7 or other suitable pivot, so that the legs are also angularly adjustable with reference to each other. The legs are conveniently secured in their adjusted positions by thumbscrews 8. The two main parts of the clamp joint are preferably identical malleable steel castings, assembled and pivotally connected back to back as shown in Figure 2.

Means are provided upon the free ends of the main frame members 1 and 2 for clasping a rail 9 of a ladder at selected rungs 10 and 11. For the leg 1, which normally carries the major portion of the compression load, there is provided a ladder-engaging foot comprising a back plate 12, hooked at its upper end 13 to seat over a rung 10. From opposite sides of the lower part of the back plate extend hooked flanges 14 for embracing the side rail of the ladder. Since the derrick may be rigged on either side of a ladder, the foot is made so that it may be placed in engagement with either side rail. The lower end of the leg 1 is provided with a clawed socket 16, enclosing a ball 17 at the tip of the shank 18 carried by the plate 12. This ball and socket connection permits universal adjustment of the leg 1 relative to the foot.

The leg 2 is also provided with a ladder engaging foot of somewhat different design, but like the lower one, also adapted to engage either rail of the ladder. This foot comprises a T-shaped channel 21 shaped to fit over a rail and rung of the ladder, clasping the parts from the rear. A readily inserted loose pin 22 through the front edges of a part of the channel, prevents the foot from slipping off. It will be observed from an inspection of Figure 1 that in use, the stress applied to the upper foot is from the rear forwardly, tending to hold the foot securely in place. The end of the leg 2 is connected for universal movement with the upper foot in the same fashion as leg 1 is connected to the lower foot; that is, by clawed socket 23 enclosing the balled end of shank 24 carried on the end of the foot. Because of this ball connection and because the foot is symmetrical with respect to a horizontal plane through the center of the ball, it may be inverted from the position shown and seated on the opposite rail of the ladder when the derrick is erected on that side.

The free end of leg 2, which extends a short distance beyond the clamp joint 3 provides a point of suspension for the load handled by the derrick. A sleeve 26 carrying a hook 27 and removably fastened in place on the leg end by a thumbscrew supplies a mounting for the pulley block 28, over which runs the tackle 29 for handling the load.

Means are provided by bracing both the derrick and the ladder on which it is mounted, against side-to-side motion. Preferably this is accomplished by a second V-shaped frame, with means for anchoring to a fixed point the apex or point of the frame, and means for connecting the free ends of the main frame members at appropriate points. A leg 31 is used to brace the ladder. A clamp joint 32 similar to that connecting legs 1 and 2 (shown in Figure 2) is disposed on leg 31 near its free end, and on leg 1 close to the lower foot. The other end of the leg 31 is connected by ball joint 33, similar to those already explained, to the anchor plate 34. This plate is provided with one or more keyhole slots so that it may be secured to a fixed portion of the building preferably near the edge 36 of the gutter, shown in Figure 1 as a dashed line. This point of anchorage may be the end or top face of a rafter, or face of a sheathing board, or the plate 34 may be laid on top of a shingled or composition roofing. The ball joint permits the necessary compensation in position; and one or more nails selected for size of head, and driven in the keyhole slots provides secure temporary fastening with ready disengagement, without removing the nails which may be left alone or driven home, as circumstances justify.

Flanges 37, preferably welded to the leg 31, adjacent its anchor plate end, provide means for pivotal connection to the other leg 38 of the second V-shaped frame. The free end of this leg is connected preferably to the leg 2 of the main frame by a clamp joint 39, similar to those already explained. Since the function of the leg 38 is that of a brace, the clamp joint 39 is arranged as near the apex of the main frame, that is, as near to clamp joint 3, as convenient, so as to secure the best distribution of stresses. It will be clear from the foregoing that it is practically immaterial whether the clamp joint 39 be on the upper end of leg 1 or on either side of clamp joint 3 on leg 2.

The derrick of the present invention is particularly useful to roofers. In this connection, a ladder is placed to extend above the edge of the roof, as indicated in Figure 1 of the drawing. The legs of the main frame are adjusted to an angular relation such that the lower foot carried by the leg 1 will hook onto a rung and clasp the side rail of the ladder preferably near the gutter edge. The upper foot, carried by the leg 2, is caught behind the rail and a rung a suitable distance above the edge of the roof. The lengths of legs 1 and 2 are then adjusted by moving the clamp joint 3 along the legs to give the desired elevation and projection of the pulley block 28 over the edge of the roof. When the main V-frame has been brought to the desired position, the leg 31 is swung by means of the joint 32 to a position such that the anchoring plate 34 may be nailed to a convenient point of anchorage on the building. The clamp 39 is next moved close to the clamp 3, and adjusted on the leg 38 to give the main frame sufficient extension to the side of the ladder so that the tackle on the block 28 and the load handled therewith will be in the clear.

As materials are raised to the edge of the roof, a workman stationed at the top of the ladder swings the materials onto the roof, as in ordinary practice; and the materials may then be distributed and laid without encountering the obstruction ordinarily presented by the base support and guy ropes of the A-frame derricks and similar structures heretofore commonly used by roofers.

When the frame is not in use, the clamp joints by which the frame members are secured in adjusted positions, are loosened; and the legs swung to substantially parallel relation. When so collapsed, the frame occupies but little space, and may be readily transported from place to place.

I claim:

1. A device of the character described comprising a V-shaped frame, means adjacent the apex of the frame for adjusting the relationships of the frame members, means upon the free ends of the members for clasping the side rail of a ladder at selected rungs, a bracing leg, means for anchoring one end of the bracing leg, and means for connecting the other end of the bracing leg to the V-shaped frame.

2. A device of the character described comprising a V-shaped frame, means adjacent the apex of the frame for adjusting the lengths and angular relationship of the frame members, means upon the free ends of the frame members for clasping a selected side rail and rung of a ladder, and a bracing leg angularly and axially adjustable upon a frame member, one of the frame members providing a pulley mounting adjacent the outer end thereof.

3. A derrick for use on a ladder comprising a V-shaped frame, means at the apex of the frame for securing the frame members in adjusted relationship, a foot adjustably secured upon the free end of each frame member, each foot having a portion for embracing a side rail and rung of the ladder, and a bracing leg universally adjustable upon one of the frame members.

4. A derrick for use on a ladder comprising a V-shaped frame, a clamp joint adjacent the apex of the frame for adjusting the length and angular relationship of the frame members, means upon the free ends of the frame members for clasping the rail of the ladder at selected rungs, a second V-shaped frame, means for securing the apex of the second frame to a fixed object, and means adjacent the free end of each of the second frame members for adjustably fixing it to a member of the first frame.

5. A derrick for use on a ladder comprising a nominally vertical compression leg, a nominally horizontal tension leg providing a pulley mounting adjacent its free end, a foot connected for universal movement on each leg for clasping the rail of the ladder at selected rungs, a clamp joint through which the free ends of both legs extend for fixing them together in desired relationship, a brace, means for anchoring one end of the brace to a fixed object, a clamp joint for fixing the other end of the brace to the lower portion of the vertical leg, a second brace pivotally connected to the first brace near its anchoring end, and a clamp joint for fixing the free end of the second brace to the horizontal leg.

WILLIAM GLENN TUTTLE.